(12) United States Patent
Wang et al.

(10) Patent No.: US 11,231,796 B2
(45) Date of Patent: Jan. 25, 2022

(54) TOUCH DISPLAY PANEL AND DISPLAY DEVICE

(71) Applicants: Chengdu BOE Optoelectronics Technology Co., Ltd., Chengdu (CN); BOE Technology Group Co., Ltd., Beijing (CN)

(72) Inventors: Li Wang, Beijing (CN); Wenfeng Guo, Beijing (CN); Jing Wang, Beijing (CN); Wei Li, Beijing (CN); Fei Li, Beijing (CN); Ming Li, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/767,642

(22) PCT Filed: Dec. 16, 2019

(86) PCT No.: PCT/CN2019/125758
§ 371 (c)(1),
(2) Date: May 28, 2020

(87) PCT Pub. No.: WO2020/143405
PCT Pub. Date: Jul. 16, 2020

(65) Prior Publication Data
US 2021/0200352 A1    Jul. 1, 2021

(30) Foreign Application Priority Data
Jan. 9, 2019    (CN) .......................... 201910019380.6

(51) Int. Cl.
*G06F 3/041*    (2006.01)
*B32B 7/12*    (2006.01)

(52) U.S. Cl.
CPC .............. *G06F 3/0412* (2013.01); *B32B 7/12* (2013.01); *B32B 2307/412* (2013.01); *B32B 2457/208* (2013.01)

(58) Field of Classification Search
CPC ......... G06F 3/0412; G06F 2203/04103; G06F 3/04164; B32B 7/12; B32B 2457/208; B32B 2307/412
See application file for complete search history.

(56) References Cited

U.S. PATENT DOCUMENTS

| 8,004,620 B2 * | 8/2011 | Ishii | G02F 1/133308 |
| | | | 349/12 |
| 8,508,701 B2 * | 8/2013 | Nakagawa | H01L 51/5246 |
| | | | 349/122 |

(Continued)

FOREIGN PATENT DOCUMENTS

| CN | 205281983 U | 6/2016 |
| CN | 107765917 A | 3/2018 |

(Continued)

OTHER PUBLICATIONS

Chinese Office Action dated Oct. 14, 2020 in related Chinese Application No. 201910019380.6.

(Continued)

*Primary Examiner* — Grant Sitta
(74) *Attorney, Agent, or Firm* — Arent Fox LLP; Michael Fainberg

(57) ABSTRACT

The present disclosure provides a touch display panel and a display device. The touch display panel includes a display substrate, a touch circuit on a side of a light emergent surface of the display substrate and a first optical adhesive between the display substrate and the touch circuit, wherein a rough contact surface exists on a part, located in a frame region, of the first optical adhesive; the touch circuit includes: a plurality of touch traces insulated from one another and (Continued)

located in the frame region; each of the touch traces is arranged to be stacked, and an orthographic projection of each of the touch traces on the display substrate covers an orthographic projection of a part, located in the frame region, of the first optical adhesive on the display substrate.

8 Claims, 4 Drawing Sheets

(56) References Cited

U.S. PATENT DOCUMENTS

| | | | |
|---|---|---|---|
| 10,330,860 B2* | 6/2019 | Shei | G02B 6/0093 |
| 2010/0245705 A1* | 9/2010 | Nakagawa | G02F 1/133308 |
| | | | 349/58 |
| 2013/0162364 A1* | 6/2013 | Lin | H01P 3/08 |
| | | | 333/5 |
| 2015/0122623 A1* | 5/2015 | Kim | G06F 3/0446 |
| | | | 200/5 R |
| 2017/0199597 A1* | 7/2017 | Son | B32B 7/05 |
| 2018/0146564 A1 | 5/2018 | Wang et al. | |
| 2019/0204963 A1 | 7/2019 | Liu et al. | |

FOREIGN PATENT DOCUMENTS

| | | | |
|---|---|---|---|
| CN | 108108057 A | | 6/2018 |
| CN | 108279810 A | | 7/2018 |
| CN | 108363521 A | | 8/2018 |
| CN | 108446057 | * | 8/2018 |
| CN | 108446057 A | | 8/2018 |
| CN | 108519699 A | | 9/2018 |
| CN | 108984022 A | | 12/2018 |
| CN | 109782951 A | | 5/2019 |
| JP | 2013131099 A | | 7/2013 |

OTHER PUBLICATIONS

Chinese Office Action dated Sep. 1, 2020 in related Chinese Application No. 201910019380.6.

* cited by examiner

TOUCH DISPLAY PANEL AND DISPLAY DEVICE

CROSS REFERENCE TO RELATED APPLICATIONS

This application is a National Stage of International Application No. PCT/CN2019/125758, filed Dec. 16, 2019, which claims the priority to the Chinese patent application No. 201910019380.6, filed with the China Patent Office on Jan. 9, 2019, both of which are incorporated herein by reference in its entirety.

FIELD

The present disclosure relates to the field of display technologies, and in particular to a touch display panel and a display device.

BACKGROUND

At present, a display screen integrated with a touch function has been widely adopted by a current advanced intelligent product. In the related art, a touch circuit may be directly bound with a display substrate by an optical adhesive, so that a touch display panel may realize both display and touch function.

SUMMARY

An embodiment of the present disclosure provides a touch display panel, including a display substrate, a touch circuit located on a side of a light emergent surface of the display substrate and a first optical adhesive between the display substrate and the touch circuit, and a rough contact surface exists on a part, in a frame region, of the first optical adhesive; the touch circuit includes: a plurality of touch traces insulated from one another and located in the frame region; and each of the touch traces is arranged to be stacked, and an orthographic projection of each of the touch traces on the display substrate completely covers an orthographic projection of the part, located in the frame region, of the first optical adhesive on the display substrate.

In a possible implementation way, in the above-mentioned touch display panel provided by the embodiment of the present disclosure, the touch traces are respectively located on two layers.

In a possible implementation way, in the above-mentioned touch display panel provided by the embodiment of the present disclosure, each of the touch traces on the first layer is in each of gaps among the touch traces on the second layer.

In a possible implementation way, in the above-mentioned touch display panel provided by the embodiment of the present disclosure, an orthographic projection of each of the touch traces on the first layer on the display substrate is provided with a region overlapped with an orthographic projection of each of the touch traces on the second layer on the display substrate.

In a possible implementation way, in the above-mentioned touch display panel provided by the embodiment of the present disclosure, a space among the touch traces is filled with a transparent adhesive material.

In a possible implementation way, in the above-mentioned touch display panel provided by the embodiment of the present disclosure, each of the touch traces includes a transparent electrode layer, a metal electrode layer and an oxide protection layer arranged to be stacked sequentially.

In a possible implementation way, in the above-mentioned touch display panel provided by the embodiment of the present disclosure, the frame region further includes: a chip substrate between the display substrate and the first optical adhesive; wherein an interface between the chip substrate and the first optical adhesive is the rough contact surface.

In a possible implementation way, the above-mentioned touch display panel provided by the embodiment of the present disclosure further includes a polarizer between the display substrate and the touch circuit, wherein a special-shaped cutting line exists on a part, located in the frame region, of the polarizer.

In a possible implementation way, the above-mentioned touch display panel provided by the embodiment of the present disclosure further includes: a packaging cover plate located on the side, away from the display substrate, of the touch circuit and a second optical adhesive between the packaging cover plate and the touch circuit; and in the frame region, a light shielding layer is further between the packaging cover plate and the second optical adhesive.

On the other hand, an embodiment of the present disclosure further provides a display device including the touch display panel provided by any one of the above-mentioned embodiments.

DETAILED DESCRIPTION OF THE EMBODIMENTS

Figure 1:
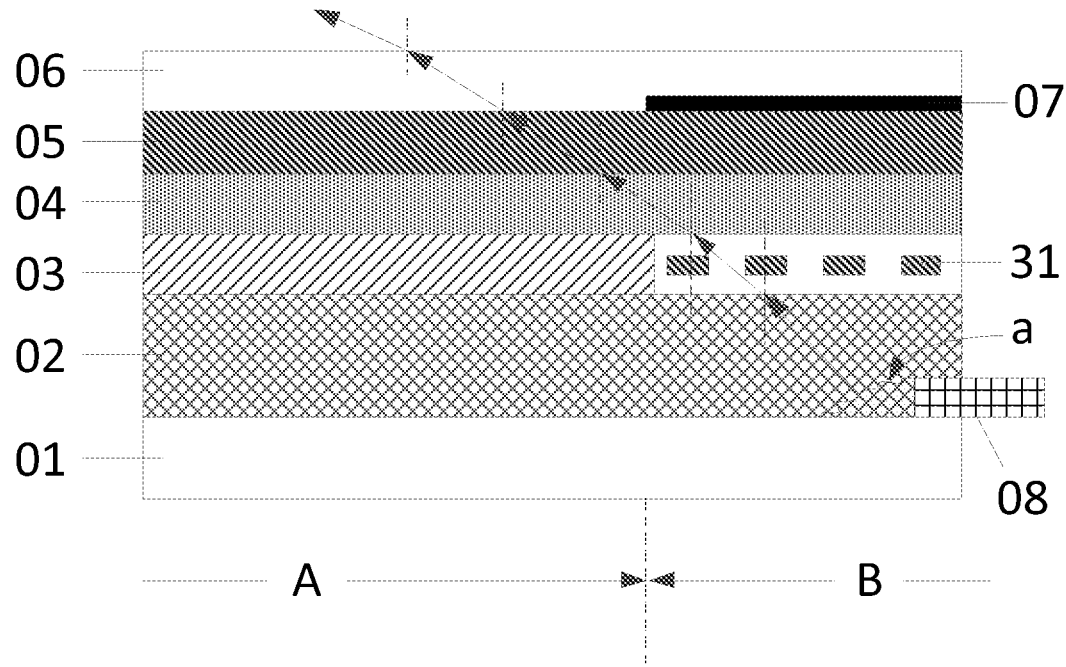
FIG. 1 is a schematic structural diagram of a touch display panel in the related art.

In the related art, a touch display panel as shown in FIG. 1 includes a display region A and a frame region B, a first optical adhesive 02 is between a display substrate 01 and a touch circuit 03. In the frame region B of the touch display panel, other components, such as a chip substrate 08, may be arranged between the first optical adhesive 02 and the display substrate 01. Due to the existence of other components, structures such as a rough surface a and a bubble line may be generated on an interface between the first optical adhesive 02 and the display substrate 01 when the first optical adhesive 02 is formed. Light may be diffusely reflected when light emitted by the display substrate 01 irradiates the structures such as the rough surface a and the bubble line, and the diffusely reflected light may pass by gaps among touch traces 31 located in the frame region B of the touch circuit 03, then the light is emitted from the display region A after being refracted by a series of film layers, such as a polarizer 04, a second optical adhesive 05 and a packaging cover plate 06, so as to result in a light leakage phenomenon of the touch display panel.

Based on the above-mentioned problems existing in the related art, embodiments of the present disclosure provide a touch display panel and a display device. In order to make objectives, technical solutions and advantages of the present disclosure clearer, the present disclosure will be further described in detail below in conjunction with accompanying drawings. Obviously, the described embodiments are only a part of the embodiments of the present disclosure, not all the embodiments. Based on the described embodiments of the present disclosure, all other embodiments obtained by those of ordinary skill in the art without creative work shall fall within the protection scope of the present disclosure.

The shape and size of each component in the accompanying drawings are only intended to schematically describe the content of the present disclosure, rather than to reflect a true proportion.

Figure 2:
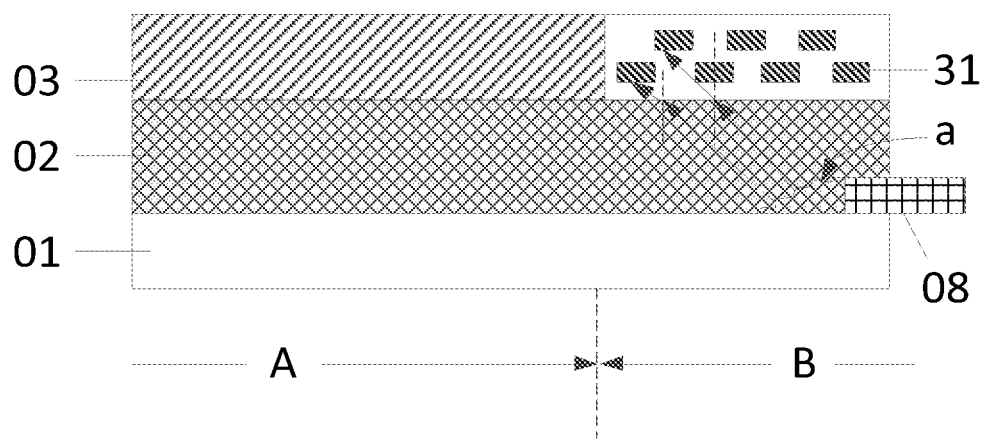
FIG. 2 is a schematic structural diagram of a touch display panel according to an embodiment of the present disclosure.

An embodiment of the present disclosure provides a touch display panel, as shown in FIG. 2, the touch display panel includes a display substrate 01, a touch circuit 03 on a side of a light emergent surface of the display substrate 01, and a first optical adhesive 02 between the display substrate 01 and the touch circuit 03, wherein a rough contact surface a exists on a part, located in a frame region B, of the first optical adhesive 02; the touch circuit 03 includes a plurality of touch traces 31 insulated from one another and located in the frame region B; wherein each of the touch traces 31 is arranged to be stacked, and an orthographic projection of each of the touch traces 31 on the display substrate 01 substantially covers an orthographic projection of the part, located in the frame region B, of the first optical adhesive 02 on the display substrate 01.

Specifically, in the touch display panel provided by the embodiment of the present disclosure, the touch display panel includes a display substrate, a touch circuit on the side of a light emergent surface of the display substrate, and a first optical adhesive between the display substrate and the touch circuit, wherein a rough contact surface exists on a part, located in a frame region, of the first optical adhesive; the touch circuit includes a plurality of touch traces insulated from one another and located in the frame region; wherein each of the touch traces is arranged to be stacked, and an orthographic projection of each of the touch traces on the display substrate substantially covers an orthographic projection of the part, located in the frame region, of the first optical adhesive on the display substrate. Due to the stacked arrangement of the touch traces, the touch traces completely cover a part, located in the frame region, of the first optical adhesive to shield diffusely reflected light caused by the rough surface, so that the light leakage phenomenon of the touch display panel may be effectively avoided.

Optionally, in the touch display panel provided by the embodiment of the present disclosure, as shown in FIG. 2, the touch traces 31 are respectively located on two layers.

It should be explained that the touch display panel provided by the embodiment of the present disclosure is described with FIG. 2 in which the touch traces are respectively located on two layers as an example, however, the present disclosure is not limited to that the touch traces are arranged on two layers and may also be arranged on three or more layers, and the specific number of layers is selected according to an actual use condition and is not specifically limited herein.

Figure 3:
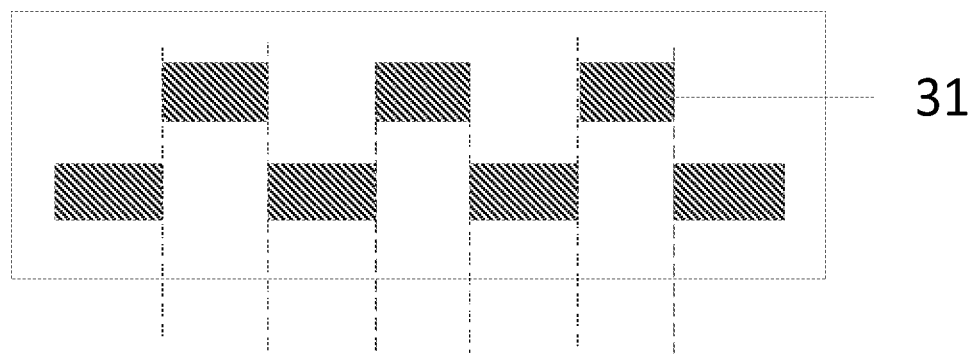
FIG. 3 is a schematic diagram of an arrangement structure of touch traces in the touch display panel according to the embodiment of the present disclosure.

Optionally, in the touch display panel provided by the embodiment of the present disclosure, as shown in FIG. 3, each of the touch traces 31 on the first layer is in each of gaps among the touch traces 31 on the second layer.

Specifically, in the touch display panel provided by the embodiment of the related art, touch traces are only arranged on one layer, and gaps exist among the touch traces, and diffusely reflected light generated on the rough contact surface may be emitted from the display region after passing by the gaps among the touch traces, however, the touch traces in the present disclosure are respectively arranged on different layers, for example, the touch traces are arranged on two layers, each of the touch traces on the first layer is in each of gaps among the touch traces on the second layer, so that each of gaps among the touch traces on the second layer may be effectively shielded, and the diffusely reflected light emitted from the gaps may be reduced.

Figure 4:
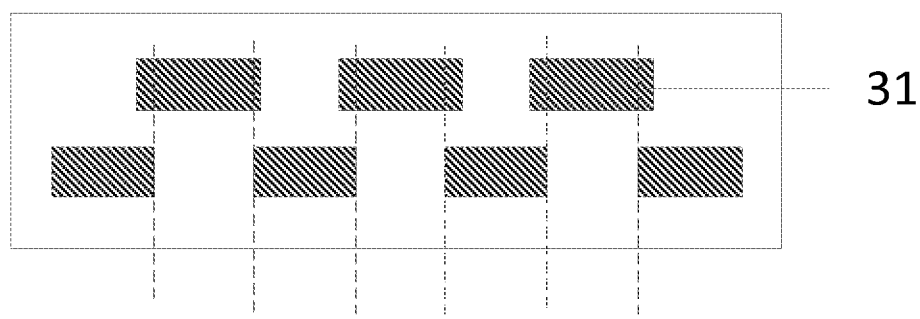
FIG. 4 is schematic diagram of another arrangement structure of the touch traces in the touch display panel according to the embodiment of the present disclosure.

Optionally, in the touch display panel provided by the embodiment of the present disclosure, as shown in FIG. 2 and FIG. 4, an orthographic projection of each of the touch traces 31 on the first layer on the display substrate 01 is provided with a region overlapped with an orthographic projection of each of the touch traces 31 on the second layer on the display substrate 01.

Specifically, in the touch display panel provided by the embodiment of the present disclosure, the area of the touch traces on the first layer is set to be greater than that of the gaps among the touch traces on the second layer, namely the touch trace on the first layer may also covers a region where parts of the touch traces on the second layer are located in addition to the gap among the touch traces on the second layer, thereby reducing the diffusely reflected light emitted from a gap between the layers to better avoid the light leakage phenomenon.

Optionally, in the touch display panel provided by the embodiment of the present disclosure, the space among the touch traces is filled with a transparent adhesive material. The transparent adhesive material may keep the touch traces insulated from one another and may also play a role in maintaining the interlayer thickness.

Figure 5:
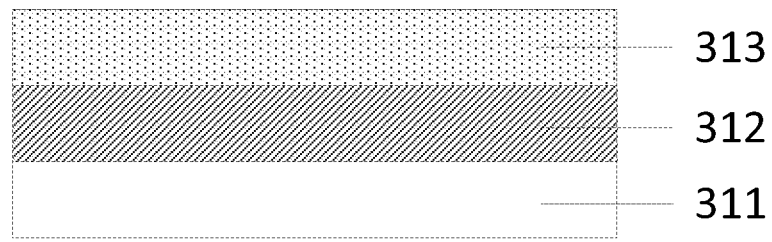
FIG. 5 is a schematic structural diagram of the touch traces in the touch display panel according to the embodiment of the present disclosure.

Optionally, in the touch display panel provided by the embodiment of the present disclosure, as shown in FIG. 5, each of the touch traces includes a transparent electrode layer 311, a metal electrode layer 312 and an oxide protection layer 313 arranged to be stacked sequentially.

Specifically, in the touch display panel provided by the embodiment of the present disclosure, the transparent electrode layer may be made of indium tin oxide, the metal electrode layer may be made of silver, the oxide protection layer may be made of zinc oxide, of course, any other materials capable of achieving the function of the film layer may be adopted in addition to the above-mentioned materials, the specific limitations thereof are omitted herein.

It should be explained that, in the touch display panel provided by the embodiment of the present disclosure, FIG. 5 only shows a hierarchical structure of each film layer in the touch traces, wherein the relative area ratio among the film layers is same as that in the related art and is not limited herein.

Figure 6:
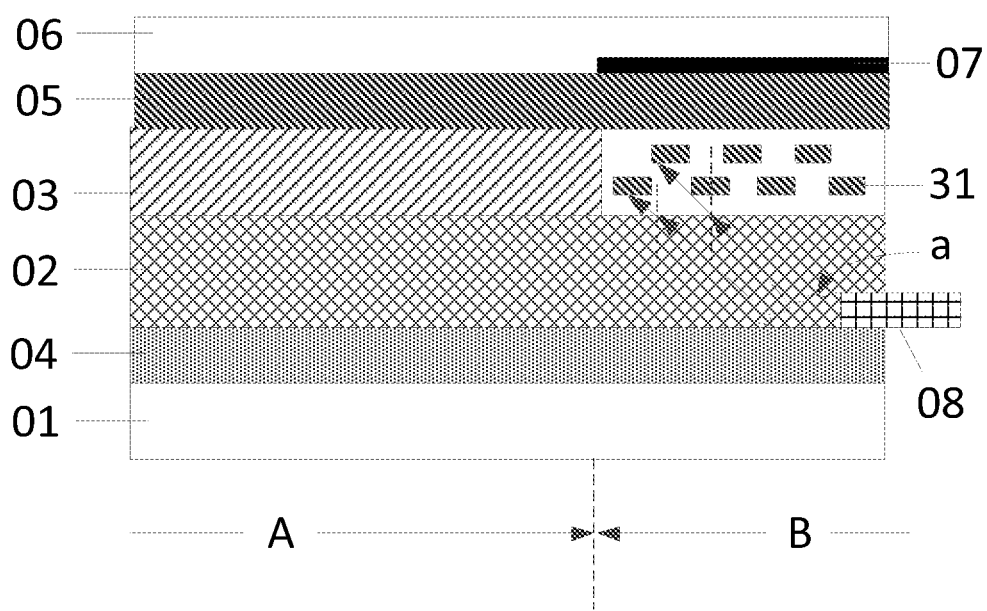
FIG. 6 is another schematic structural diagram of the touch display panel according to the embodiment of the present disclosure.

Optionally, in the touch display panel provided by the embodiment of the present disclosure, as shown in FIG. 6, the frame region B further includes: a chip substrate 08 between the display substrate 01 and the first optical adhesive 02; wherein an interface between the chip substrate 08 and the first optical adhesive 02 is the rough contact surface a.

Specifically, in the touch display panel provided by the embodiment of the present disclosure, due to the arrangement of the chip substrate, the rough contact surface is easy to form due to certain extrusion which may exist on the interface when the first optical adhesive is formed, and therefore, light emitted by the display substrate may be diffusely reflected.

Optionally, the touch display panel provided by the embodiment of the present disclosure, as shown in FIG. 6, further includes a polarizer 04 between the display substrate 01 and the touch circuit 03, wherein a special-shaped cutting line (not specifically shown in the figure) exists on a part, located in the frame region B, of the polarizer 04.

Specifically, in the touch display panel provided by the embodiment of the present disclosure, due to the existence of the special-shaped cutting line, the light emitted by the display substrate may be diffusely reflected, in this way, the polarizer is arranged between the touch circuit and the display substrate, and the generated diffusely reflected light may be shielded by virtue of an arrangement structure of the touch traces, thereby avoiding the light leakage phenomenon.

It should be explained that, in the touch display panel provided by the embodiment of the present disclosure, reasons of forming the rough contact surface are various, but are not limited to the reasons mentioned in the abovementioned embodiment, and reflected light generated by the film layers or components located between the display substrate and the touch circuit may be shielded by the structures of the touch traces provided by the embodiment of the present disclosure.

Optionally, the touch display panel provided by the embodiment of the present disclosure, as shown in FIG. 6, further includes a packaging cover plate 06 on the side, away from the display substrate 01, of the touch circuit 03 and a second optical adhesive 05 between the packaging cover plate 06 and the touch circuit 03; and in the frame region B, a light shielding layer 07 is further between the packaging cover plate 06 and the second optical adhesive 05.

Figure 7:
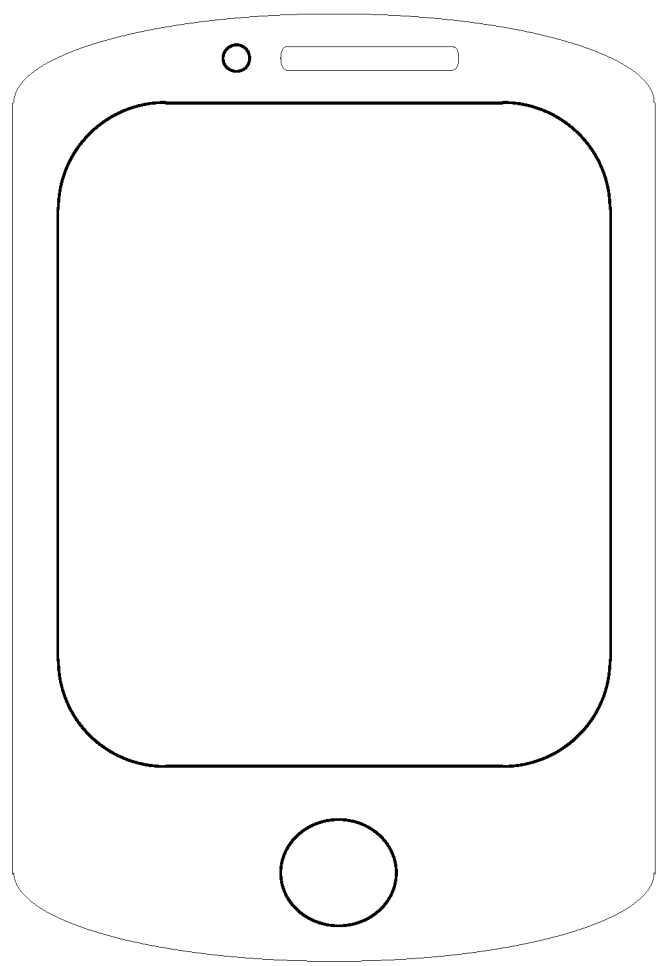
FIG. 7 is a schematic structural diagram of a display device according to an embodiment of the present disclosure.

Based on the same inventive concept, as shown in FIG. 7, an embodiment of the present disclosure further provides a display device including the touch display panel provided by any one of the above-mentioned embodiments.

Specifically, the display device may be any product or component with a display function, such as a mobile phone, a tablet personal computer, a television, a display, a notebook computer, a digital photo frame and a navigator, and is not limited herein.

Both the principle and detailed description of the display device are same as those of the touch display panel provided by the above-mentioned embodiment, and therefore, the display device may be implemented by reference to the specific embodiment of the touch display panel provided by the above-mentioned embodiment, and the descriptions thereof are omitted herein.

The embodiments of the present disclosure provide a touch display panel and a display device. The touch display panel includes: a display substrate, a touch circuit located on one side of a light emergent surface of the display substrate, and a first optical adhesive between the display substrate and the touch circuit, wherein a rough contact surface exists on a part, located in a frame region, of the first optical adhesive; the touch circuit includes a plurality of touch traces insulated from one another and located in the frame region; wherein each of the touch traces is arranged to be stacked, and an orthographic projection of each of the touch traces on the display substrate completely substantially covers an orthographic projection of a part, located in the frame region, of the first optical adhesive on the display substrate. Due to the stacked arrangement of the touch traces, the touch traces completely cover the part, located in the frame region, of the first optical adhesive to shield diffusely reflected light caused by the rough surface, so that the light leakage phenomenon of the touch display panel may be effectively avoided.

Obviously, the skilled in the art can make various alterations and variations on the present disclosure without departing from the spirit and scope of the present disclosure. In this way, if these alterations and variations of the present disclosure fall within the scopes of the claims and the equivalent technologies of the present disclosure, the present disclosure is also intended to include the alterations and variations.

The invention claimed is:

1. A touch display panel, comprising:
    a display substrate, a touch circuit on a side of a light emergent surface of the display substrate, and a first optical adhesive between the display substrate and the touch circuit, wherein a rough contact surface existing on a part, in a frame region, of the first optical adhesive, and the touch circuit comprises a plurality of touch traces insulated from one another and located in the frame region; and
    each of the touch traces is arranged to be stacked, and an orthographic projection of each of the touch traces on the display substrate covers an orthographic projection of a part, located in the frame region, of the first optical adhesive on the display substrate;
    wherein the touch traces are respectively located on two layers, and an orthographic projection of each of the touch traces on the first layer on the display substrate is provided with a region overlapped with an orthographic projection of each of the touch traces on the second layer on the display substrate.

2. The touch display panel according to claim 1, wherein each of the touch traces on the first layer is in each of gaps among the touch traces on the second layer.

3. The touch display panel according to claim 1, wherein a space among the touch traces is filled with a transparent adhesive material.

4. The touch display panel according to claim 1, wherein each of the touch traces comprises a transparent electrode layer, a metal electrode layer and an oxide protection layer arranged to be stacked sequentially.

5. The touch display panel according to claim 1, wherein the frame region further comprises: a chip substrate between the display substrate and the first optical adhesive; wherein an interface between the chip substrate and the first optical adhesive is the rough contact surface.

6. The touch display panel according to claim 1, further comprising a polarizer between the display substrate and the touch circuit, wherein a special-shaped cutting line existing on a part, located in the frame region, of the polarizer.

7. The touch display panel according to claim 1, further comprising a packaging cover plate on the side, away from the display substrate, of the touch circuit and a second optical adhesive between the packaging cover plate and the touch circuit; and
    in the frame region, a light shielding layer being further between the packaging cover plate and the second optical adhesive.

8. A display device, comprising the touch display panel according to claim 1.

* * * * *